United States Patent
Wu (10) Patent No.: US 10,582,556 B2
(45) Date of Patent: Mar. 3, 2020

(54) DEVICE AND METHOD FOR HANDLING A BEARER TYPE CHANGE

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 14 days.

(21) Appl. No.: 16/059,047

(22) Filed: Aug. 9, 2018

(65) Prior Publication Data

US 2019/0053310 A1    Feb. 14, 2019

Related U.S. Application Data

(60) Provisional application No. 62/566,327, filed on Sep. 30, 2017, provisional application No. 62/566,324, (Continued)

(51) Int. Cl.
*H04W 76/15* (2018.01)
*H04W 76/27* (2018.01)
(Continued)

(52) U.S. Cl.
CPC ....... *H04W 76/15* (2018.02); *H04W 36/0069* (2018.08); *H04W 72/0446* (2013.01); (Continued)

(58) Field of Classification Search
CPC ............. H04W 76/15; H04W 36/0069; H04W 72/0446; H04W 76/12; H04W 80/08; H04W 76/27; H04W 36/0033
See application file for complete search history.

(56) References Cited

U.S. PATENT DOCUMENTS

2015/0215965 A1   7/2015   Yamada
2015/0264562 A1*  9/2015   Wu .................. H04W 12/04
                                              380/270
(Continued)

FOREIGN PATENT DOCUMENTS

EP    2 835 925 A1    2/2015
GB    2528913  A      2/2016
(Continued)

OTHER PUBLICATIONS

3GPP TS 37.340 V0.2.0 (Jun. 2017).
(Continued)

*Primary Examiner* — Will W Lin
(74) *Attorney, Agent, or Firm* — Winston Hsu (57) ABSTRACT

A communication device for handling a bearer type change comprises at least one storage device for storing instructions and at least one processing circuit coupled to the at least one storage device. The at least one processing circuit is configured to execute the instructions stored in the at least one storage device. The instructions comprise receiving a first RRC message from a first BS; transmitting a first RRC response message to the first BS; establishing a PDCP entity; transmitting a first plurality of PDCP SDUs to the first BS; receiving a second RRC message from the first BS, wherein the second message configures the MCG bearer type to a SCG bearer type or a split bearer type; transmitting a second RRC response message to the first BS; reconfiguring the PDCP entity; and transmitting a second plurality of PDCP SDUs to a second BS when connecting to the first BS.

10 Claims, 8 Drawing Sheets

Related U.S. Application Data filed on Sep. 30, 2017, provisional application No. 62/547,074, filed on Aug. 17, 2017, provisional application No. 62/546,574, filed on Aug. 17, 2017, provisional application No. 62/543,997, filed on Aug. 11, 2017.

(51) Int. Cl.
| | | |
|---|---|---|
| *H04W 80/08* | (2009.01) | |
| *H04W 76/12* | (2018.01) | |
| *H04W 72/04* | (2009.01) | |
| *H04W 36/00* | (2009.01) | |

(52) U.S. Cl.
CPC ........... *H04W 76/12* (2018.02); *H04W 76/27* (2018.02); *H04W 80/08* (2013.01); *H04W 36/0033* (2013.01)

(56) References Cited

U.S. PATENT DOCUMENTS

2016/0135095 A1*  5/2016  Wu ................... H04W 36/0027
                                                            370/328
2018/0124647 A1*  5/2018  Dai ....................... H04W 28/06

FOREIGN PATENT DOCUMENTS

| WO | 2015/065080 A1 | 5/2015 |
| WO | 2015/145255 A2 | 10/2015 |
| WO | 2015/145255 A3 | 10/2015 |

OTHER PUBLICATIONS

Search Report dated Jan. 2, 2019 for EP application No. 18188537.7, pp. 1-8.
Ericsson, "PDCP reception algorithm", 3GPP TSG-RAN WG2 #98-AH, Tdoc R2-1707154, Jun. 27-29, 2017, Qingdao, P.R. of China, XP051301647, pp. 1-8.
3GPP TS 38.323 V0.2.0 (Aug. 2017), "3rd Generation Partnership Project; Technical Specification Group Radio Access Network; NR; Packet Data Convergence Protocol (PDCP) specification (Release 15)", XP051450225, pp. 1-27.
3GPP TS 37.340 V0.2.1 (Aug. 2017), "3rd Generation Partnership Project; Technical Specification Group Radio Access Network; Evolved Universal Terrestrial Radio Access (E-UTRA) and NR; Multi-connectivity; Stage 2 (Release 15)", XP051336704, pp. 1-43.
Huawei (rapporteur), "Summary of [97bis#12][NR] Bearer type change (Huawei)", 3GPP TSG-RAN WG2 NR Adhoc#2, R2-1707403, Jun. 27-29, 2017, Qingdao, China, XP051301892, pp. 1-27.
3GPP TS 36.323 V14.3.0 (Jun. 2017), "3rd Generation Partnership Project; Technical Specification Group Radio Access Network; Evolved Universal Terrestrial Radio Access (E-UTRA); Packet Data Convergence Protocol (PDCP) specification (Release 14)", XP051306340, pp. 1-43.
Ericsson, "PDCP lossless SN reconfiguration", 3GPP TSG-RAN WG2 AH NR#2, R2-1707152, Jun. 27-29, 2017, Qingdao, P.R. of China, XP051301645, pp. 1-6.
3rd Generation Partnership Project; Technical Specification Group Radio Access Network; NR; Packet Data Convergence Protocol (PDCP) specification (Release 15), 3GPP TS 38.323 V0.1.0 (Jun. 2017), pp. 1-25.
Office action dated Apr.24, 2019 for the Taiwan application No. 107127936, filed Aug. 10, 2018, pp. 1-10.

* cited by examiner

FIG. 8

DEVICE AND METHOD FOR HANDLING A BEARER TYPE CHANGE

CROSS REFERENCE TO RELATED APPLICATIONS

This application claims the benefits of U.S. Provisional Applications No. 62/543,997 filed on Aug. 11, 2017, No. 62/547,074 filed on Aug. 17, 2017, No. 62/546,574 filed on Aug. 17, 2017, No. 62/566,324 filed on Sep. 30, 2017 and No. 62/566,327 filed on Sep. 30, 2017, which are incorporated herein by reference.

BACKGROUND OF THE INVENTION

1. Field of the Invention

The present invention relates to a device and a method used in a wireless communication system, and more particularly, to a device and a method of handling a bearer type change.

2. Description of the Prior Art

In a new radio (NR) system, a master node and a secondary node may be configured to the UE in dual connectivity. It is still unknown how to process data received or to be transmitted, if a bearer type of a radio bearer is changed. Thus, it is important to define an operation to solve the problem.

SUMMARY OF THE INVENTION

The present invention therefore provides a communication device for handling a bearer type change to solve the abovementioned problem.

A method for handling a bearer type change comprises: receiving a first radio resource control (RRC) message on a signaling radio bearer (SRB) from a first base station (BS), wherein the first RRC message configures a data radio bearer (DRB) which is a master cell group (MCG) bearer, and configures a first packet data convergence protocol (PDCP) configuration for the DRB; transmitting a first RRC response message to the first BS on the SRB, in response to the first RRC message; establishing a PDCP entity for the DRB according to the first PDCP configuration; transmitting a first plurality of PDCP Service Data Units (SDUs) to the first BS according to the PDCP entity and a TX_NEXT associated to the PDCP entity; receiving a second RRC message on the SRB from the first BS, wherein the second message configures the MCG bearer type of the DRB to a secondary cell group (SCG) bearer type or a split bearer type, and configures a second PDCP configuration for the DRB; transmitting a second RRC response message on the SRB to the first BS, in response to the second RRC message; reconfiguring the PDCP entity according to the second PDCP configuration; and transmitting a second plurality of PDCP SDUs to a second BS according to the PDCP entity and the TX_NEXT associated to the PDCP entity, when connecting to the first BS.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
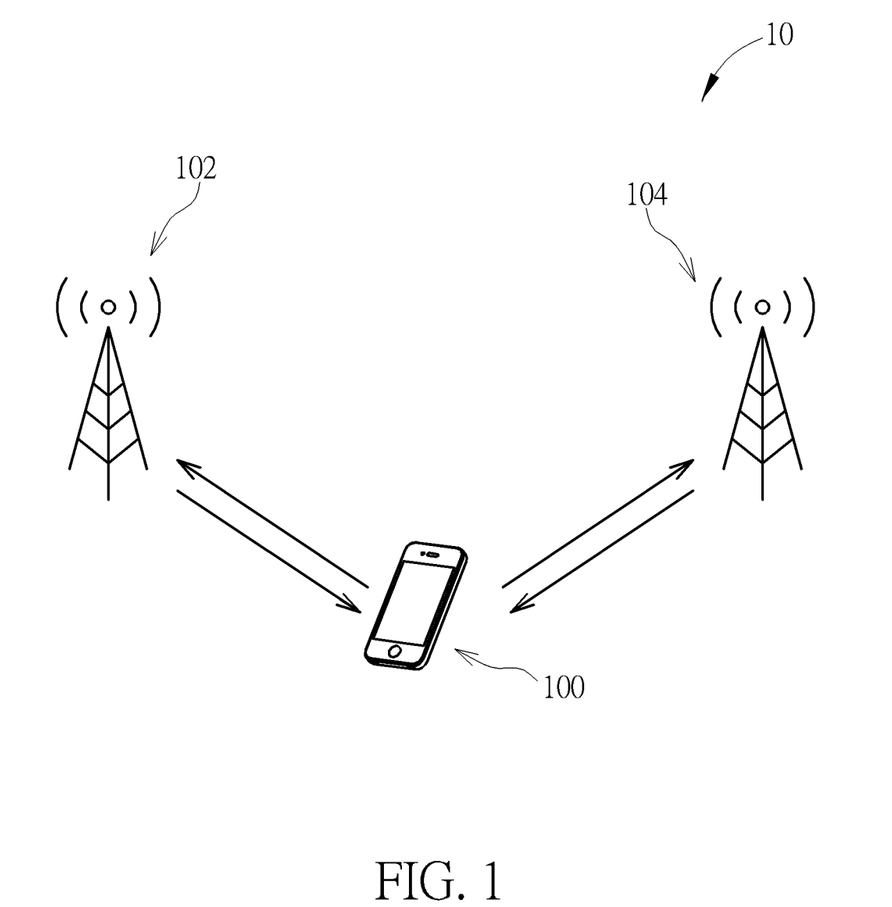
FIG. 1 is a schematic diagram of a wireless communication system according to an example of the present invention.

In FIG. 1, the wireless communication system 10 is briefly composed of a communication device 100, a base station (BS) 102 and a BS 104. In FIG. 1, the communication device 100, the BS 102 and the BS 104 are simply utilized for illustrating the structure of the wireless communication system 10.

The communication device 100 may be configured to simultaneously connect to the BSs 102 and 104 (i.e., dual connectivity (DC)). For example, the communication device 100 in the dual connectivity (DC) may receive packets from the BS 102 at a first carrier frequency and the BS 104 at a second carrier frequency, or the communication device 100 may transmit packets to the BS 102 at a first carrier frequency and the BS 104 at a second carrier frequency. In addition, one of the BSs 102 and 104 may be a master node (MN) and the other BS may be a secondary node (SN).

The communication device 100 may be a user equipment (UE), a mobile phone, a laptop, a tablet computer, an electronic book, a portable computer system, a vehicle or an airplane. In addition, for an uplink (UL), the communication device 100 is a transmitter and the BS(s) 102 and/or 104 is a receiver(s), and for a downlink (DL), the BS(s) 102 and/or 104 is a transmitter(s) and the communication device 100 is a receiver.

Figure 2:
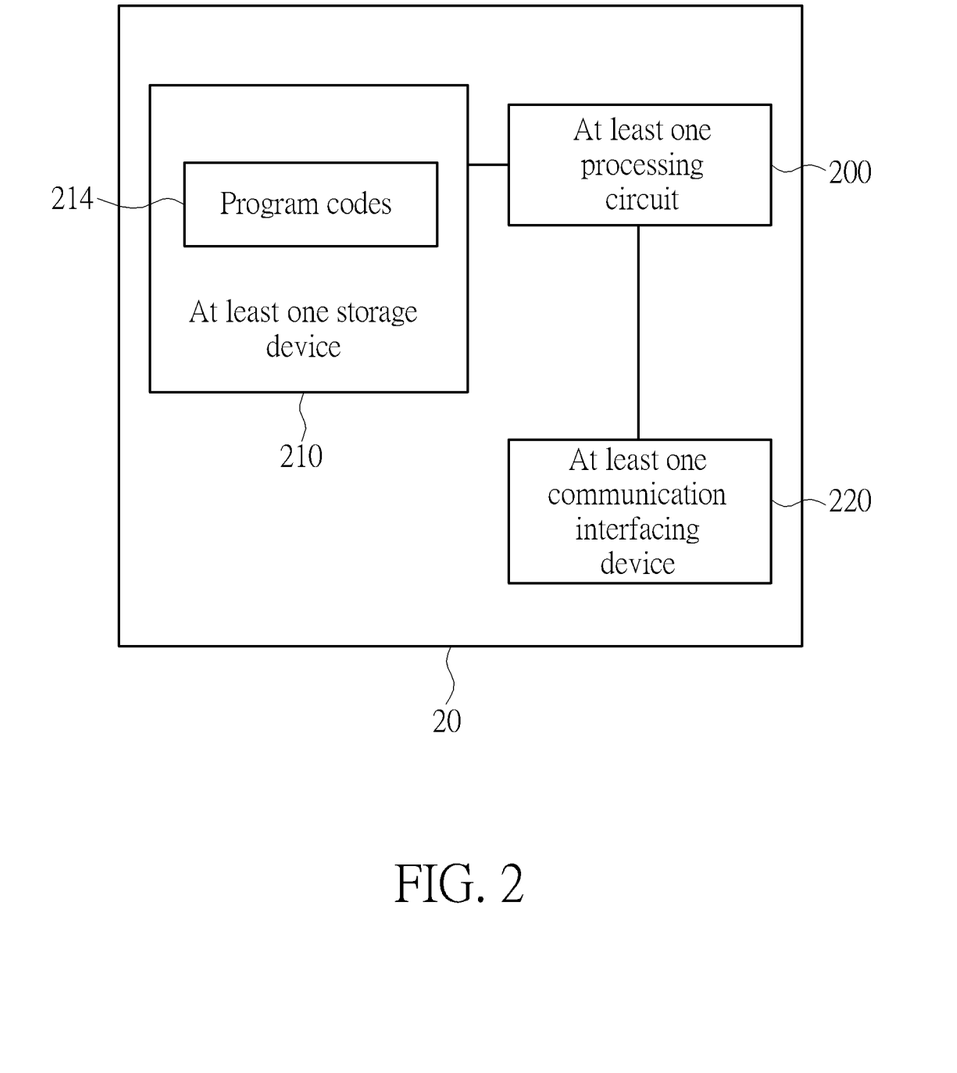
FIG. 2 is a schematic diagram of a communication device according to an example of the present invention.

In FIG. 2, the communication device 20 may be the communication device 100, the BS(s) 102 and/or 104 shown in FIG. 1, but is not limited herein. The communication device 20 may include at least one processing circuit 200 such as a microprocessor or Application Specific Integrated Circuit (ASIC), at least one storage device 210 and at least one communication interfacing device 220. The at least one storage device 210 may be any data storage device that may store program codes 214, accessed and executed by the at least one processing circuit 200. Examples of the at least one storage device 210 include but are not limited to a subscriber identity module (SIM), read-only memory (ROM), flash memory, random-access memory (RAM), hard disk, optical data storage device, non-volatile storage device, non-transitory computer-readable medium (e.g., tangible media), etc. The at least one communication interfacing device 220 is preferably at least one transceiver and is used to transmit and receive signals (e.g., data, messages and/or packets) according to processing results of the at least one processing circuit 200.

A protocol architecture is used for illustrating that the use of a radio bearer (RB) depends on how the RB is established. A RB may be a data RB (DRB) for a user plane data transmission or reception, and a signaling RB (SRB) for a control plane data transmission or reception. A DRB configuration comprises at least one of a DRB identity, a packet data convergence protocol (PDCP) configuration, a radio link control (RLC) configuration, a logical channel identity and a logical channel configuration (e.g., priority or logical channel group). A SRB configuration comprises a SRB identity, the RLC configuration and the logical channel configuration. In the dual connectivity (DC), there may be three types of RB: a master cell group (MCG) bearer, a secondary cell group (SCG) bearer and a split bearer. The MCG bearer utilizes radio protocols located at the MN, to use the MN radio resources (i.e., time and frequency resources). The SCG bearer utilizes radio protocols located at the SN, to use the SN radio resources. The split bearer may utilize protocols located at both the MN and the SN, to use both the MN resources and the SN resources. The split bearer is a MCG split bearer or a SCG split bearer. A DRB is the MCG bearer, the SCG bearer or the split bearer. A SRB is configured as the MCG bearer or the split bearer.

In one example, a communicate device (e.g., the communication device 100 or the BS(s) 102/104) may use the following state variables to communicate PDCP Service Data Units (SDUs) associated to a RB with another communication device (e.g., the communication device 100 or the BS(s) 102/104).

TX_NEXT, which indicates a COUNT value of a next PDCP SDU to be transmitted and is used by a PDCP entity. At establishment of the PDCP entity, the TX_NEXT is set to an initial value (e.g., 0).

RX_NEXT, which indicates a COUNT value of a next PDCP SDU expected to be received and is used by the PDCP entity. At establishment of the PDCP entity, the RX_NEXT is set to an initial value (e.g., 0).

RX_DELIV, which indicates a COUNT value of a first PDCP SDU not delivered to upper layers and is used by the PDCP entity, but still waited for. At establishment of the PDCP entity, the RX_DELIV is set to an initial value (e.g., 0).

RX_REORD, which indicates a COUNT value following a COUNT value associated with a PDCP Data PDU which triggers/triggered t-Reordering to be started or restarted, and is used by the PDCP entity.

In another example, a communicate device (e.g., the communication device 100 or the BS(s) 102/104) may use the following state variables to communicate PDCP SDUs associated to a RB with another communication device (e.g., the communication device 100 or the BS(s) 102/104).

Next_PDCP_TX_SN, which indicates the PDCP SN of the next PDCP SDU to be transmitted by a PDCP entity. At establishment of the first PDCP entity, the Next_PDCP_TX_SN is set to an initial value (e.g., 0).

TX_HFN, which indicates a HFN value for the generation of a COUNT value used for the next PDCP SDU to be transmitted by the PDCP entity. At establishment of the first PDCP entity, the TX_HFN to is set to an initial value (e.g., 0).

Next_PDCP_RX_SN, which indicates the next expected PDCP SN to be received by a PDCP entity associated to the RB. At establishment of the PDCP entity, the Next_PDCP_RX_SN is set to an initial value (e.g., 0).

RX_HFN, which indicates a HFN value for the generation of a COUNT value used for a PDCP SDU received by the PDCP entity. At establishment of the PDCP entity, the RX_HFN is set to an initial value (e.g., 0).

In the following examples, a UE is used for representing the communication device 100 in FIG. 1, to simplify the illustration of the examples.

Figure 3:
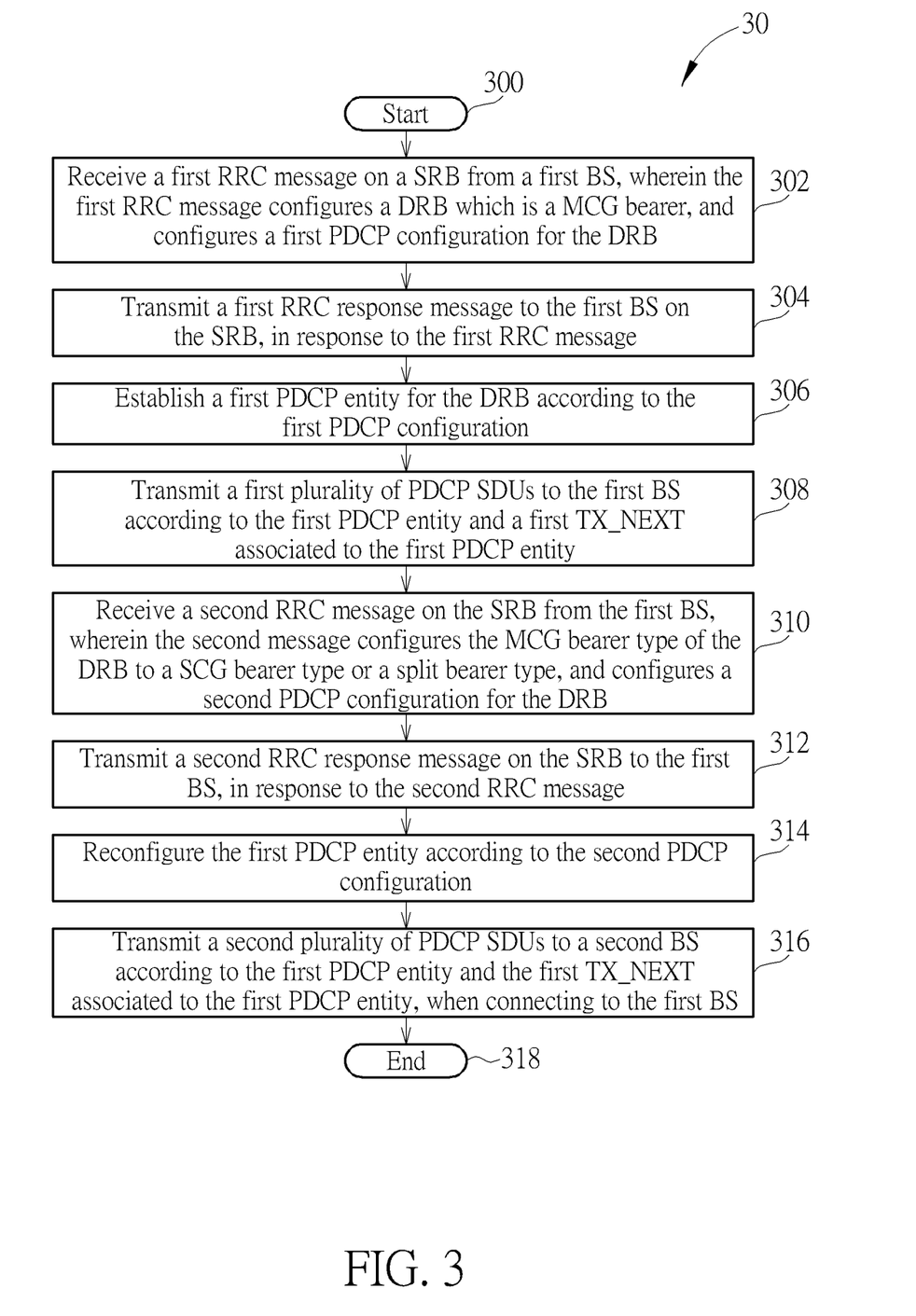
FIG. 3 is a flowchart of a process according to an example of the present invention.

A process 30 in FIG. 3 is utilized in a UE to handle a bearer type change, and includes the following steps:

Step 300: Start.

Step 302: Receive a first radio resource control (RRC) message on a SRB from a first BS, wherein the first RRC message configures a DRB which is a MCG bearer type, and configures a first PDCP configuration for the DRB.

Step 304: Transmit a first RRC response message to the first BS on the SRB, in response to the first RRC message.

Step 306: Establish a first PDCP entity for the DRB according to the first PDCP configuration.

Step 308: Transmit a first plurality of PDCP Service Data Units (SDUs) to the first BS according to the first PDCP entity and a first TX_NEXT associated to the first PDCP entity.

Step 310: Receive a second RRC message on the SRB from the first BS, wherein the second message configures the MCG bearer type of the DRB to a SCG bearer type or a split bearer type, and configures a second PDCP configuration for the DRB.

Step 312: Transmit a second RRC response message on the SRB to the first BS, in response to the second RRC message.

Step 314: Reconfigure the first PDCP entity according to the second PDCP configuration.

Step 316: Transmit a second plurality of PDCP SDUs to a second BS according to the first PDCP entity and the first TX_NEXT associated to the first PDCP entity, when connecting to the first BS.

Step 318: End.

Realization of the process 30 is not limited to the above description. The following examples may be applied to the process 30.

In one example, the steps 314 and 316 in the process 30 can be replaced by the steps 314a and 316a, respectively.

Step 314a: Release the first PDCP entity, establishes a second PDCP entity according to the second PDCP configuration, and sets a second TX_NEXT to the first TX_NEXT, in response to the second RRC message.

Step 316a: Transmit a second plurality of PDCP SDUs to a second BS according to the second PDCP entity and the second TX_NEXT associated to the first PDCP entity, when connecting to the first BS.

In one example, the step 314 in the process 30 can be replaced by the step 314b.

Step 314b: Reconfigure the first PDCP entity according to the second PDCP configuration, and set the first TX_NEXT to a COUNT value associated to a missing PDCP SDU in the first plurality of PDCP SDUs, in response to the second RRC message.

In one example, the steps 314 and 316 in the process 30 can be replaced by the steps 314c and 316c, respectively.

Step 314c: Release the first PDCP entity, establish a second PDCP entity according to the second PDCP configuration, and sets a second TX_NEXT to the first TX_NEXT, in response to the second RRC message.

Step 316c: Transmit a second plurality of PDCP SDUs to a second BS according to the second PDCP entity and the second TX_NEXT, when connecting to the first BS.

Figure 4:
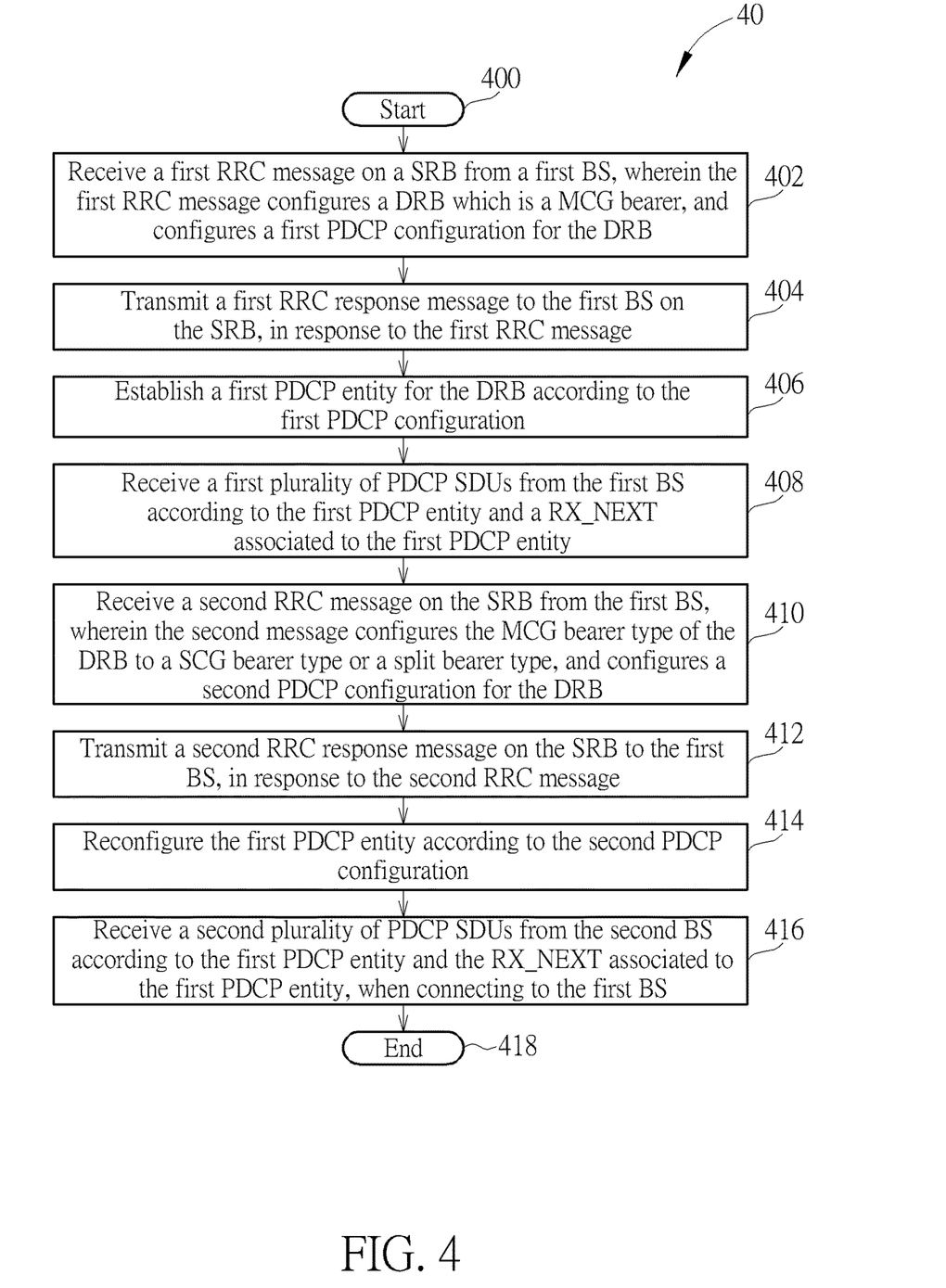
FIG. 4 is a flowchart of a process according to an example of the present invention.

A process 40 in FIG. 4 is utilized in a UE to handle a bearer type change, and includes the following steps:

Step 400: Start.

Steps 402-406: Same as the steps 302-306.

Step 408: Receive a first plurality of PDCP SDUs from the first BS according to the first PDCP entity and a RX_NEXT associated to the first PDCP entity.

Steps 410-412: Same as the steps 310-312.

Step 414: Reconfigure the first PDCP entity according to the second PDCP configuration.

Step 416: Receive a second plurality of PDCP SDUs from the second BS according to the first PDCP entity and the RX_NEXT associated to the first PDCP entity, when connecting to the first BS.

Step 418: End.

Realization of the process 40 is not limited to the above description. The following examples may be applied to the process 40.

In one example, the steps 414 and 416 in the process 40 can be replaced by the steps 414a and 416a, respectively.

Step 414a: Release the first PDCP entity, establishes a second PDCP entity according to the second PDCP configuration, and sets a second RX_NEXT to the first RX_NEXT, in response to the second RRC message.

Step 416a: Receive a second plurality of PDCP SDUs from a second BS according to the second PDCP entity and the second RX_NEXT associated to the first PDCP entity, when connecting to the first BS.

In one example, the step 414 in the process 40 can be replaced by the steps 414b.

Step 414b: Reconfigure the PDCP entity according to the second PDCP configuration, and configure the RX_NEXT to a COUNT value associated to a missing PDCP SDU in the first plurality of PDCP SDUs, in response to the second RRC message.

In one example, the steps 414 and 416 in the process 60 can be replaced by the steps 414c and 416c, respectively.

Step 414c: Release the first PDCP entity, establish a second PDCP entity according to the second PDCP configuration, and sets a second RX_NEXT to a COUNT value associated to a missing PDCP SDU, in response to the second RRC message.

Step 416c : Receive a second plurality of PDCP SDUs from a second BS according to the second PDCP entity and the second RX_NEXT associated to the second PDCP entity, when connecting to the first BS.

In the steps 414b and 414c, the UE detects (or determines) the missing PDCP SDU from the first plurality of PDCP SDUs. For example, the plurality of PDCP SDUs has a first PDCP SDU and a second PDCP SDU. A COUNT value of the first PDCP SDU is M and a COUNT value of the second COUNT value is N (N>M). Then, the UE detects (or determines) the missing PDCP SDU which is a PDCP SDU with a COUNT value=M+1, M+2, . . . or N−1, since the UE does not receive the PDCP SDU. The COUNT value comprises a RX_HDN and a PDCP Sequence Number (SN) of the missing PDCP SDU.

Figure 5:
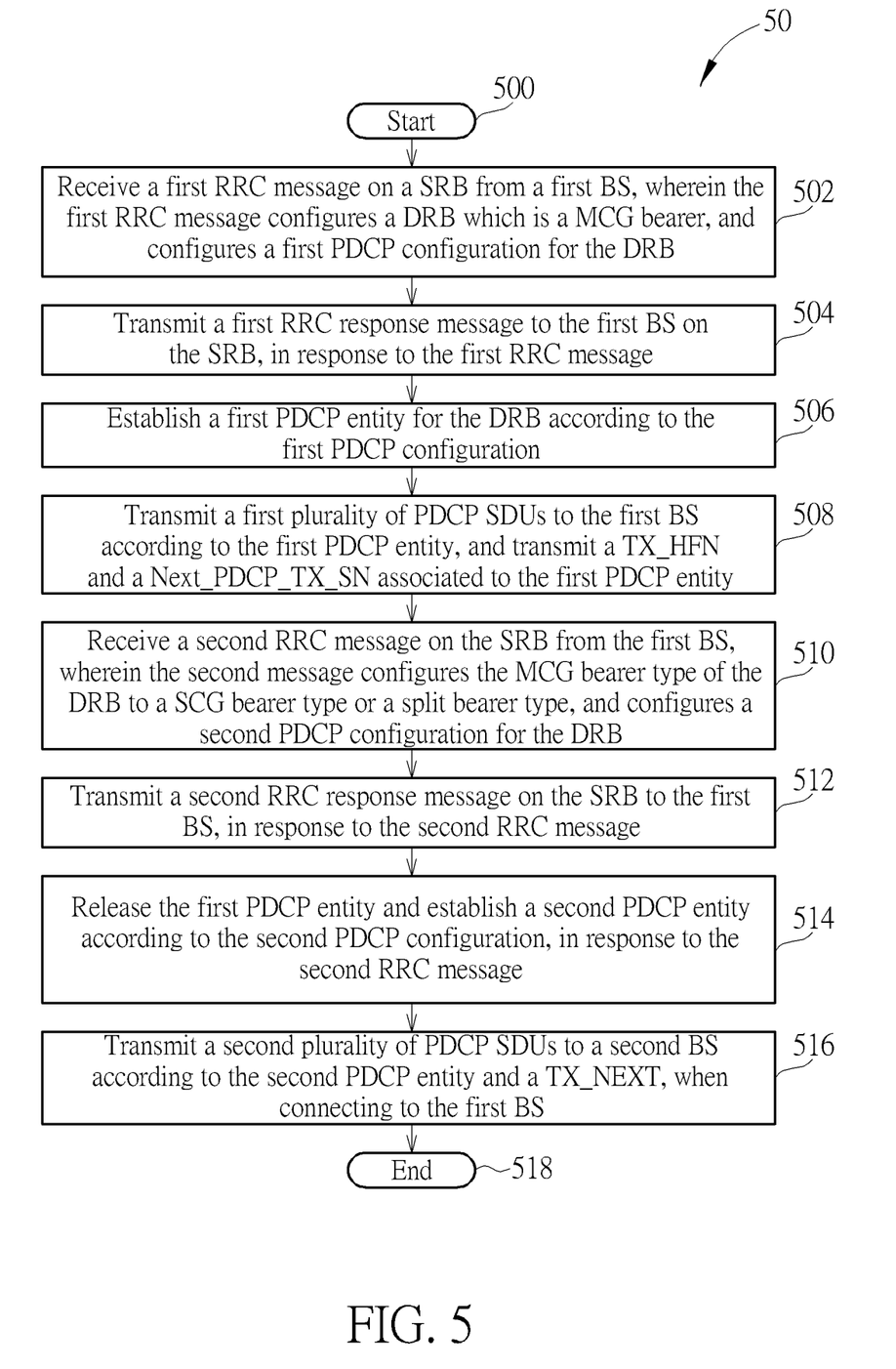
FIG. 5 is a flowchart of a process according to an example of the present invention.

A process 50 in FIG. 5 is utilized in a UE to handle a bearer type change, and includes the following steps:

Step 500: Start.

Step 502: Receive a first RRC message on a SRB from a first BS, wherein the first RRC message configures a DRB which is a MCG bearer type, and configures a first PDCP configuration for the DRB.

Step 504: Transmit a first RRC response message to the first BS on the SRB, in response to the first RRC message.

Step 506: Establish a first PDCP entity for the DRB according to the first PDCP configuration.

Step 508: Transmit a first plurality of PDCP SDUs to the first BS according to the first PDCP entity, and transmit a TX_HFN and a Next_PDCP_TX_SN associated to the first PDCP entity.

Step 510: Receive a second RRC message on the SRB from the first BS, wherein the second message configures the MCG bearer type of the DRB to a SCG bearer type or a split bearer type, and configures a second PDCP configuration for the DRB.

Step 512: Transmit a second RRC response message on the SRB to the first BS, in response to the second RRC message.

Step 514: Release the first PDCP entity and establish a second PDCP entity according to the second PDCP configuration, in response to the second RRC message.

Step 516: Transmit a second plurality of PDCP SDUs to a second BS according to the second PDCP entity and a TX_NEXT, when connecting to the first BS.

Step 518: End.

Realization of the process 50 is not limited to the above description. The following examples may be applied to the process 50.

In one example, the UE sets the first TX_NEXT to an initial value (e.g., 0) when establishing the second PDCP entity.

Figure 6:
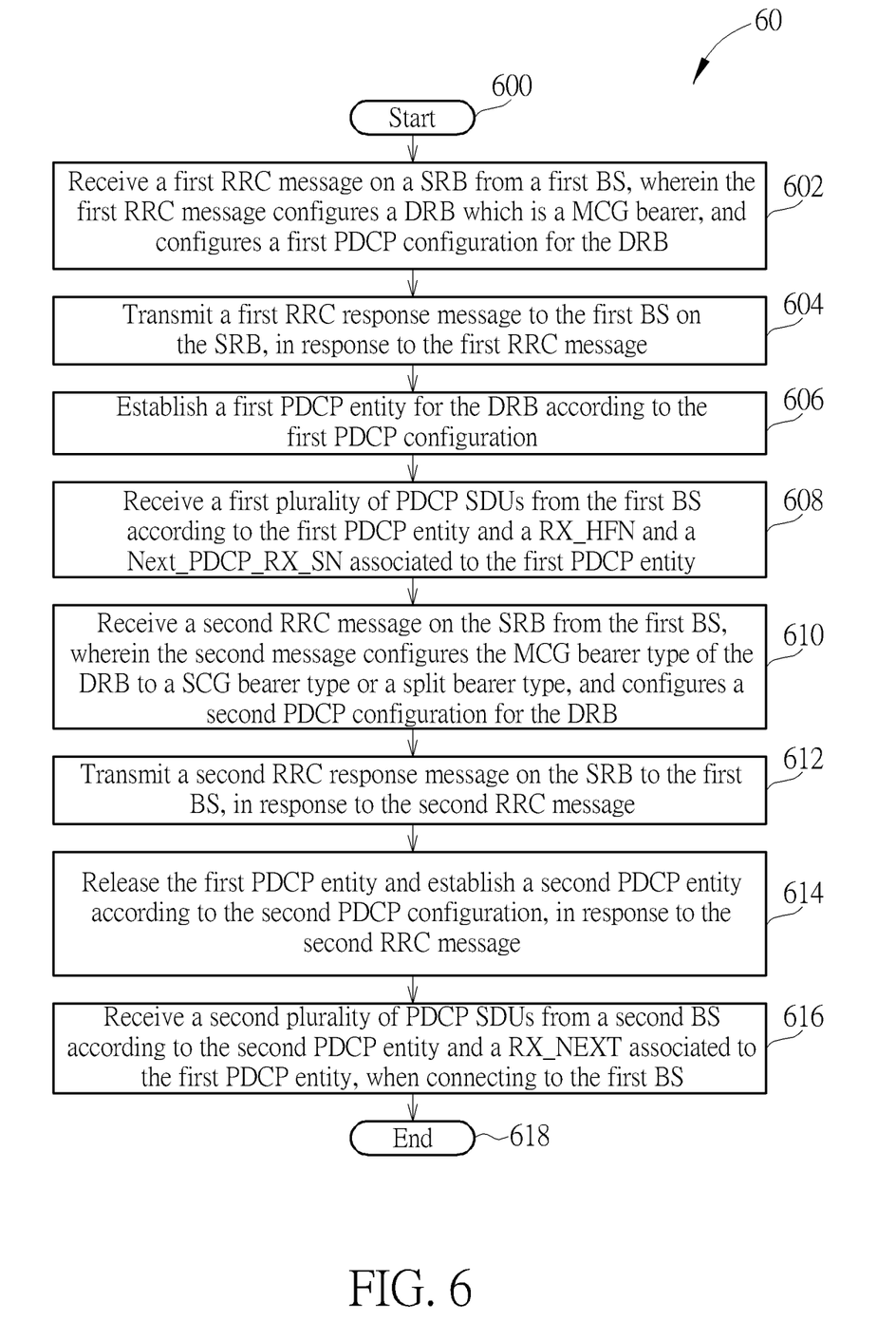
FIG. 6 is a flowchart of a process according to an example of the present invention.

A process 60 in FIG. 6 is utilized in a UE to handle a bearer type change, and includes the following steps:

Step 600: Start.

Steps 602-606: Same as the steps 502-506.

Step 608: Receive a first plurality of PDCP SDUs from the first BS according to the first PDCP entity and a RX_HFN and a Next_PDCP_RX_SN associated to the first PDCP entity.

Steps 610-612: Same as the steps 510-512.

Step 614: Release the first PDCP entity and establish a second PDCP entity according to the second PDCP configuration, in response to the second RRC message.

Step 616: Receive a second plurality of PDCP SDUs from a second BS according to the second PDCP entity and a first RX_NEXT associated to the first PDCP entity, when connecting to the first BS.

Step 618: End.

Realization of the process 60 is not limited to the above description. The following examples may be applied to the process 60.

In one example, the UE sets the RX_NEXT to an initial value (e.g., 0) when establishing the second PDCP entity.

Processes 50 and 60 may be combined. The PDCP entities in the processes 50 and 60 may be different PDCP entities. The second RRC message in the processes 50 and 60 may be same or different.

The following examples can be applied to the processes 30-60.

In one example, the UE receives a PDCP status report from the second BS, when the second BS receives a confirmation message from the first BS or when the second BS detects that the UE connects to the second BS. The confirmation message is a Secondary Node (SN) (e.g., secondary gNB) Reconfiguration Complete message. The second BS detects that the UE connects to the second BS, when the second BS receives a random access preamble configured in the second RRC message, or receives a UE identifier, from the UE. The UE identifier is configured in the second RRC message or in a RRC message transmitted to the UE before the second RRC message. The UE identifier is a cell radio network temporary identifier.

In one example, the PDCP status report comprises a COUNT value of a first missing PDCP SDU (i.e., the first PDCP SDU which is not received by the first BS or the second BS). The PDCP status report also comprises a bitmap indicating whether at least one PDCP SDU which has at least one COUNT value are received or not received by the first BS or the second BS. The UE sets the first TX_NEXT or the second TX_NEXT to the COUNT value of the first missing PDCP SDU or to a third COUNT value derived from the COUNT value of the first missing PDCP SDU and the bitmap. For example, when the last bit in the bitmap indicates missing (e.g., the last bit has value 0), the UE sets the third COUNT value associated to the last missing PDCP SDU to (the COUNT value of the first missing PDCP SDU+bit position of the last bit). That is, the first TX_NEXT or the second TX_NEXT=(the COUNT value of the first missing PDCP SDU+bit position of the last bit (e.g., the N-th bit)). For example, when the last bit in the bitmap indicates acknowledged or no need to be retransmitted (e.g., the last bit has value 1), the UE sets the third COUNT value associated to the last missing PDCP SDU to (the COUNT value of the missing PDCP SDU+bit position of the last bit+1). That is, the first TX_NEXT or the second TX_NEXT=(the COUNT value of the first missing PDCP SDU+bit position of the last bit+1).

Figure 7:
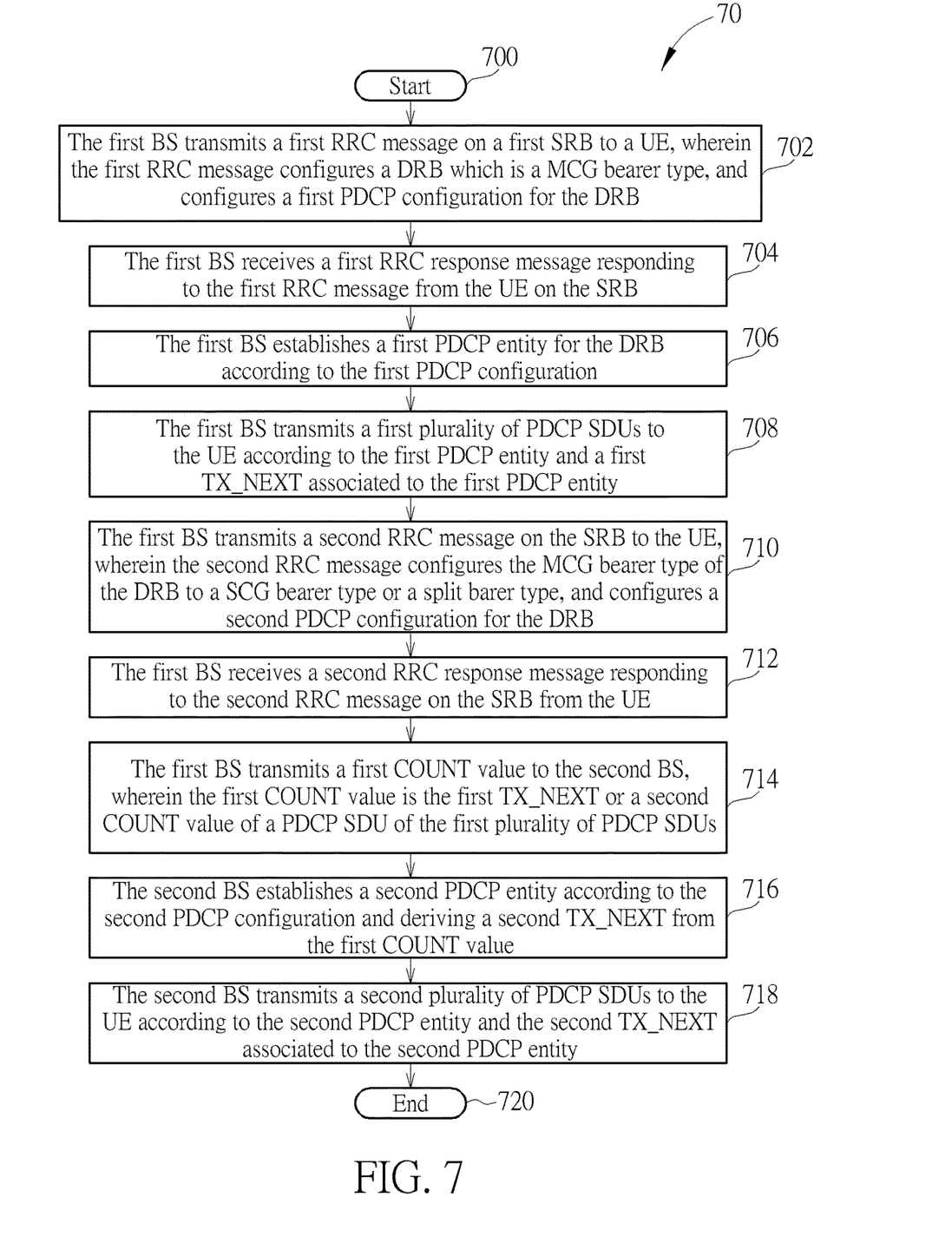
FIG. 7 is a flowchart of a process according to an example of the present invention.

A process 70 in FIG. 7 is utilized in a network comprising a first BS (e.g., the BS 102 in FIG. 1) of a first RAT and a second BS (e.g., the BS 104 in FIG. 1) of a second RAT to handle a bearer type change, and includes the following steps:

Step 700: Start.

Step 702: The first BS transmits a first RRC message on a first SRB to a UE, wherein the first RRC message configures a DRB which is a MCG bearer type, and configures a first PDCP configuration for the DRB.

Step 704: The first BS receives a first RRC response message responding to the first RRC message from the UE on the SRB.

Step 706: The first BS establishes a first PDCP entity for the DRB according to the first PDCP configuration.

Step 708: The first BS transmits a first plurality of PDCP SDUs to the UE according to the first PDCP entity and a first TX_NEXT associated to the first PDCP entity.

Step 710: The first BS transmits a second RRC message on the SRB to the UE, wherein the second RRC message configures the MCG bearer type of the DRB to a SCG bearer type or a split barer type, and configures a second PDCP configuration for the DRB.

Step 712: The first BS receives a second RRC response message responding to the second RRC message on the SRB from the UE.

Step 714: The first BS transmits a first COUNT value to the second BS, wherein the first COUNT value is the first TX_NEXT or a second COUNT value of a PDCP SDU of the first plurality of PDCP SDUs.

Step 716: The second BS establishes a second PDCP entity according to the second PDCP configuration and deriving a second TX_NEXT from the first COUNT value.

Step 718: The second BS transmits a second plurality of PDCP SDUs to the UE according to the second PDCP entity and the second TX_NEXT associated to the second PDCP entity Step 720: End.

Realization of the process 70 is not limited to the above description. The following examples may be applied to the process 70.

In one example, the steps 714 and 716 in the process 70 can be replaced by the steps 714a and 716a, respectively.

Step 714a: The first BS derives a TX_HFN from the first TX_NEXT, and transmits the TX_HFN and a PDCP SN to the second BS, wherein the PDCP SN is derived from the first TX_NEXT, or is a PDCP SN of a PDCP SDU of the first plurality of PDCP SDUs.

Step 716a: The second BS establishes a second PDCP entity according to the second PDCP configuration, and derives a second TX_NEXT from the TX_HFN and the PDCP SN for the second PDCP entity.

In one example, the first BS derives the PDCP SN and the TX_HFN from the first TX_NEXT by setting the PDCP SN to a SN of the first TX_NEXT and setting the TX_HFN to hyper frame number (HFN) of the first RX_NEXT. The SN of the first TX_NEXT is the number of least significant bits (LSBs) equal to the first PDCP SN length or the second PDCP SN length in the first TX_NEXT. The HFN of the first TX_NEXT is the number of most significant bits (MSBs) equal to HFN length in the first TX_NEXT, wherein the HFN length=(length of the first TX_NEXT)–the first PDCP SN length or the second PDCP SN length. The first BS receives or does not receive the second PDCP SN length. If the second PDCP SN length is not received, the first BS derives the TX_HFN and the PDCP SN according to the first PDCP SN length.

In one example, the PDCP SDU of the first plurality of PDCP SDUs indicates that a successful transmission of a corresponding PDCP Protocol Data Unit (PDU) is not (or has not been) confirmed by a lower layer of a PDCP in the first BS.

Figure 8:
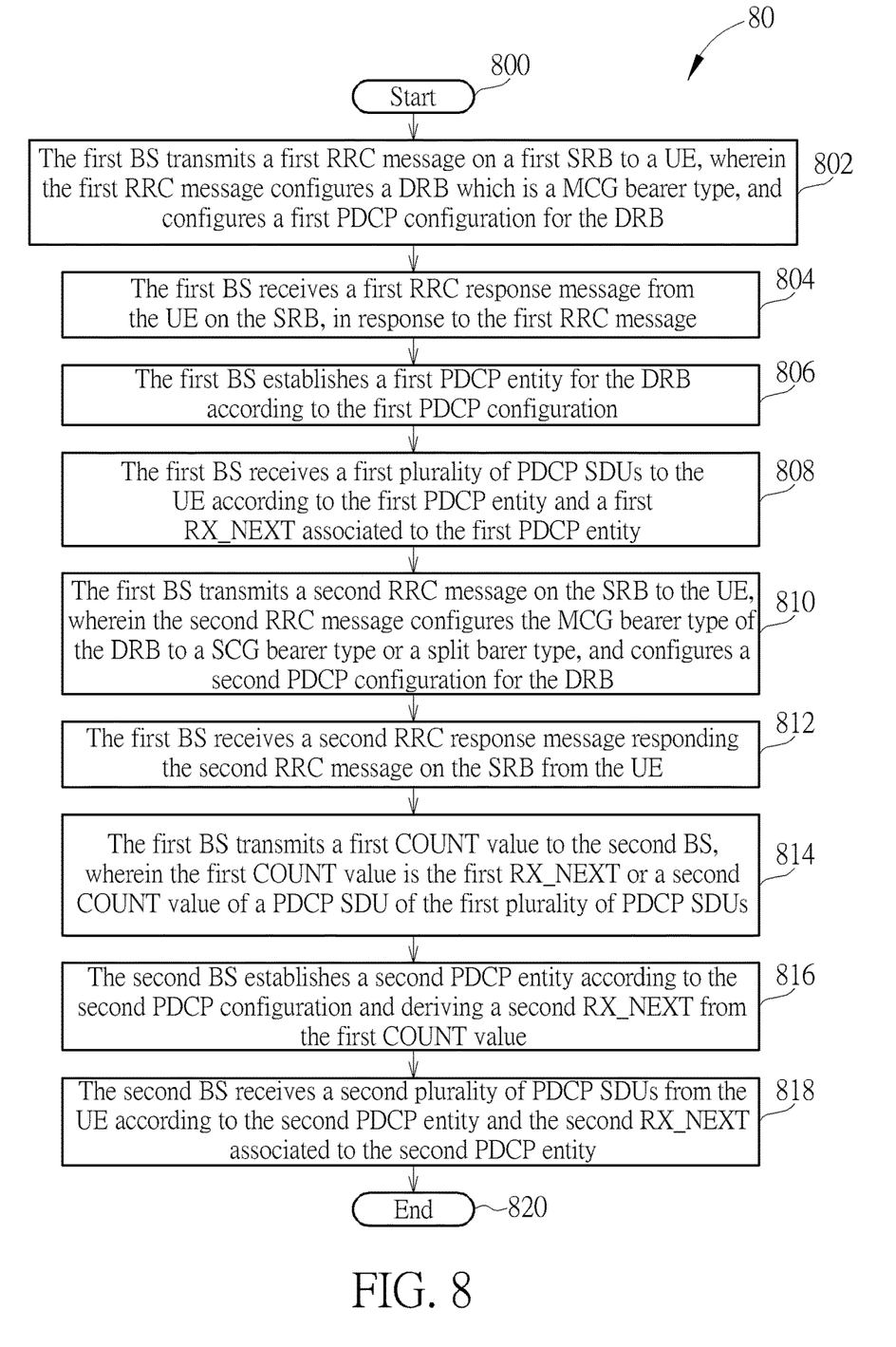
FIG. 8 is a flowchart of a process according to an example of the present invention.

A process 80 in FIG. 8 is utilized in a network comprising a first BS (e.g., the BS 102 in FIG. 1) of a first RAT and a second BS (e.g., the BS 104 in FIG. 1) of a second RAT to handle a bearer type change, and includes the following steps:

Step 800: Start.

Step 802: The first BS transmits a first RRC message on a first SRB to a UE, wherein the first RRC message configures a DRB which is a MCG bearer type, and configures a first PDCP configuration for the DRB.

Step 804: The first BS receives a first RRC response message from the UE on the SRB, in response to the first RRC message.

Step 806: The first BS establishes a first PDCP entity for the DRB according to the first PDCP configuration.

Step 808: The first BS receives a first plurality of PDCP SDUs to the UE according to the first PDCP entity and a first RX_NEXT associated to the first PDCP entity.

Step 810: The first BS transmits a second RRC message on the SRB to the UE, wherein the second RRC message configures the MCG bearer type of the DRB to a SCG bearer type or a split barer type, and configures a second PDCP configuration for the DRB.

Step 812: The first BS receives a second RRC response message responding the second RRC message on the SRB from the UE.

Step 814: The first BS transmits a first COUNT value to the second BS, wherein the first COUNT value is the first RX_NEXT or a second COUNT value of a PDCP SDU of the first plurality of PDCP SDUs.

Step 816: The second BS establishes a second PDCP entity according to the second PDCP configuration and deriving a second RX_NEXT from the first COUNT value.

Step 818: The second BS receives a second plurality of PDCP SDUs from the UE according to the second PDCP entity and the second RX_NEXT associated to the second PDCP entity Step 820: End.

Realization of the process 80 is not limited to the above description. The following examples may be applied to the process 80.

In one example, the steps 814 and 816 in the process 80 can be replaced by the steps 814a and 816a, respectively.

Step 814a: The first BS derives a RX_HFN from the first RX_NEXT, and transmits the RX_HFN and a PDCP SN to the second BS, wherein the PDCP SN is derived from the first RX_NEXT, or is a PDCP SN of a missing PDCP SDU.

Step 816a: The second BS establishes a second PDCP entity according to the second PDCP configuration, and derives a second RX_NEXT from the RX_HFN and the PDCP SN for the second PDCP entity.

In one example, the first BS derives the PDCP SN and the RX_HFN from the first RX_NEXT by setting the PDCP SN to SN of the first RX_NEXT and setting the RX_HFN to HFN of the first RX_NEXT. The SN of the first RX_NEXT is the number of least significant bits (LSBs) equal to the first PDCP SN length or the second PDCP SN length in the first RX_NEXT. The HFN of the first RX_NEXT is the number of most significant bits (MSBs) equal to HFN length in the first RX_NEXT, wherein the HFN length=(length of the first RX_NEXT)–the first PDCP SN length or the second PDCP SN length. The first BS receives or does not receive the second PDCP SN length. If the second PDCP SN length is not received, the first BS derives the RX_HFN and the PDCP SN according to the first PDCP SN length.

The first BS detects (or determines) the missing PDCP SDU from the first plurality of PDCP SDUs. For example, the first plurality of PDCP SDUs has the first PDCP SDU and the second PDCP SDU. A PDCP SN of the first PDCP SDU is M and a PDCP SN of the second PDCP SDU is N (N>M). Then, the UE detects (or determines) the missing PDCP SDU which is a PDCP SDU with a PDCP SN=M+1, M+2, . . . or N−1 since the first BS does not receive the PDCP SDU.

In one example, the first BS transmits a bitmap indicating other at least one missing PDCP SDU which has at least one PDCP SN after the PDCP SN of the missing PDCP SDU (e.g., the first missing PDCP SDU), to the second BS. In one example, the second BS derives the second RX_NEXT by setting the second RX_NEXT to a combination of the RX_HFN in MSBs of the second RX_NEXT and the PDCP SN for the second PDCP entity in LSBs of the second RX_NEXT. In one example, the second BS derives the second RX_NEXT from the PDCP SN, the RX_HFN and the bitmap. For example, when the last bit in the bitmap indicates missing (e.g., the last bit has value 0), the second BS sets the second RX_NEXT to ((a combination of RX_HFN as MSBs of the second RX_NEXT and the PDCP SN as LSBs of the second RX_NEXT)+bit position of the last bit). For example, when the last bit in the bitmap indicates acknowledged or no need to be retransmitted (e.g., the last bit has value 1), the second BS sets the second RX_NEXT to ((combination of RX_HFN as MSBs of the second RX_NEXT and the PDCP SN as LSBs of the second RX_NEXT)+bit position of the last bit+1).

In one example, the first BS detects (or determines) the missing PDCP SDU from the first plurality of PDCP SDUs. For example, the first plurality of PDCP SDUs has the first PDCP SDU and the second PDCP SDU. A COUNT value of the first PDCP SDU is M and a COUNT value of the second PDCP SDU is N (N>M). Then, the UE detects (or determines) the missing PDCP SDU which is a PDCP SDU with a COUNT value=M+1, M+2, . . . or N−1 since the first BS does not receive the PDCP SDU.

In one example, the first BS transmits a bitmap indicating other at least one missing PDCP SDU which has at least one COUNT value after the COUNT value of the missing PDCP SDU (e.g., the first missing PDCP SDU), to the second BS. In one example, the second BS derives the second RX_NEXT by setting the second RX_NEXT to the COUNT value of the last missing PDCP SDU derived from the COUNT value of the missing PDCP SDU and the bitmap. For example, when the last bit in the bitmap indicates missing (e.g., the last bit has value 0), the second BS may set the second RX_NEXT to (the COUNT value of the missing PDCP SDU+bit position of the last bit (e.g., the N-th bit)). For example, when the last bit in the bitmap indicates acknowledged or no need to be retransmitted (e.g., the last bit has value 1), the second BS sets the second RX_NEXT to (the COUNT value of the missing PDCP SDU+bit position of the last bit (e.g. the N-th bit)+1).

The following examples can be applied to the processes 30-80.

In one example, the first PDCP configuration is a PDCP configuration of a first RAT and configures a PDCP SN length, a reordering timer value, a header compression or a RLC mode. The second PDCP configuration is a PDCP configuration of a second RAT and configures a PDCP SN length, a reordering timer value, header compression or a RLC mode. The first RAT may be the same as or different from the second RAT. In one example, the first RAT is an evolved universal terrestrial radio access (E-UTRA), and the second RAT is a new radio (NR). The first BS is a master evolved Node-B (MeNB), and the second BS is a SgNB. The split bearer is a MCG split bearer or a SCG split bearer.

In one example, the UE may transmit a PDCP status report to the second BS according to the first PDCP entity or the second PDCP entity, when the DRB is configured to be the SCG bearer type or the split bearer type, in response to the second RRC message, or when the UE receives a transmission from the second BS. The transmission is a random access response responding a random access preamble transmitted by the UE to the second BS. The transmission is a physical DL shared channel (PDSCH) transmission comprising the UE identifier or comprising a specific medium access control (MAC) control element. The transmission is a physical DL control channel (PDCCH) transmission including a cyclic redundancy check (CRC) scrambled by the UE identifier. The PDCP status report comprises a COUNT value of the first missing PDCP SDU (i.e., the first PDCP SDU which is not received by the UE from the first BS or the second BS). The PDCP status report may comprise a bitmap indicating that at least one PDCP SDU is not received.

In one example, the UE transmits a PDCP status report to the first BS according to the first PDCP entity, when the first DRB is configured to be the MCG bearer type. The PDCP status report comprises a PDCP SN of the first missing PDCP SDU (i.e., the first PDCP SDU which is not received by the UE from the first BS).

It should be noted that although the examples above are described to clarify the related operations of corresponding processes, the examples can be combined or modified arbitrarily according to system requirements and/or design considerations.

Those skilled in the art should readily make combinations, modifications and/or alterations on the abovementioned description and examples. For example, the skilled person easily makes new embodiments of the network based on the embodiments and examples of the UE, and makes new embodiments of the UE based on the embodiments and examples of the network. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20. Any of the above processes and examples above may be compiled into the program codes 214.

To sum up, the present invention provides methods and devices for handling a bearer type change. The UE determines a TX_NEXT value to transmit PDCP SDUs when the bearer type is changed. Thus, the problem in the art is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling a bearer type change, comprising:
   at least one storage device; and
   at least one processing circuit, coupled to the at least one storage device, wherein the at least one storage device stores, and the at least one processing circuit is configured to execute instructions of:
   receiving a first radio resource control (RRC) message on a signaling radio bearer (SRB) from a first base station (BS), wherein the first RRC message configures a data radio bearer (DRB) which is a master cell group (MCG) bearer type, and configures a first packet data convergence protocol (PDCP) configuration for the DRB;
   transmitting a first RRC response message to the first BS on the SRB, in response to the first RRC message;
   establishing a PDCP entity for the DRB according to the first PDCP configuration;
   transmitting a first plurality of PDCP Service Data Units (SDUs) to the first BS according to the PDCP entity and a TX_NEXT associated to the PDCP entity;
   receiving a second RRC message on the SRB from the first BS, wherein the second RRC message configures the MCG bearer type of the DRB to a secondary cell group (SCG) bearer type or a split bearer type, and configures a second PDCP configuration for the DRB;
   transmitting a second RRC response message on the SRB to the first BS, in response to the second RRC message;
   reconfiguring the PDCP entity according to the second PDCP configuration; and
   transmitting a second plurality of PDCP SDUs to a second BS according to the PDCP entity and the TX_NEXT associated to the PDCP entity, when connecting to the first BS.

2. The communication device of claim 1, wherein the instructions further comprise:
   receiving a third plurality of PDCP SDUs from the first BS according to the PDCP entity and a RX_NEXT associated to the PDCP entity; and
   receiving a fourth plurality of PDCP SDUs from the second BS according to the PDCP entity and the RX_NEXT associated to the PDCP entity, when connecting to the first BS.

3. The communication device of claim 1, wherein the instructions further comprise:
   transmitting a PDCP status report to the second BS.

4. A communication device for handling a bearer type change, comprising:
   at least one storage device; and
   at least one processing circuit, coupled to the at least one storage device, wherein the at least one storage device stores, and the at least one processing circuit is configured to execute instructions of:
   receiving a first radio resource control (RRC) message on a signaling radio bearer (SRB) from a first base station (BS), wherein the first RRC message configures a data radio bearer (DRB) which is a master cell group (MCG) bearer type, and configures a first packet data convergence protocol (PDCP) configuration for the DRB;
   transmitting a first RRC response message to the first BS on the SRB, in response to the first RRC message;
   establishing a first PDCP entity for the DRB according to the first PDCP configuration;
   transmitting a first plurality of PDCP Service Data Units (SDUs) to the first BS according to the first PDCP entity, and transmitting a TX_HFN and a Next_PDCP_TX_SN associated to the PDCP entity;
   receiving a second RRC message on the SRB from the first BS, wherein the second RRC message configures the MCG bearer type of the DRB to a secondary cell group (SCG) bearer type or a split bearer type, and setting a second PDCP configuration for the DRB;
   transmitting a second RRC response message on the SRB to the first BS, in response to the second RRC message;
   releasing the first PDCP entity, and establishing a second PDCP entity according to the second PDCP configuration, in response to the second RRC message; and
   transmitting a second plurality of PDCP SDUs to a second BS according to the second PDCP entity and a TX_NEXT, when connecting to the first BS.

5. The communication device of claim 4, wherein the instructions further comprise:
   receiving a third plurality of PDCP SDUs from the first BS according to a third PDCP entity and a RX_HFN and a Next_PDCP_RX_SN;
   releasing the third PDCP entity, and establishing a fourth PDCP entity according to the second PDCP configuration; and
   receiving a fourth plurality of PDCP SDUs from the second BS according to the fourth PDCP entity and a RX_NEXT, when connecting to the first BS.

6. The communication device of claim 5, wherein the instructions further comprise:
   detecting a missing PDCP SDU from the first plurality of PDCP SDUs.

7. A network comprising a first base station (BS) of a first radio access technology (RAT) and a second BS of a second RAT, for handling a bearer type change, comprising:
   at least one storage device; and
   at least one processing circuit, coupled to the at least one storage device, wherein the at least one storage device stores, and the at least one processing circuit is configured to execute instructions of:
   the first BS transmitting a first radio resource control (RRC) message on a signaling radio bearer (SRB) to a communication device, wherein the first RRC message configures a data radio bearer (DRB) which is a master cell group (MCG) bearer type, and configures a first packet data convergence protocol (PDCP) configuration for the DRB;

the first BS receiving a first RRC response message responding to the first RRC message, from the communication device on the SRB;

the first BS establishing a first PDCP entity for the DRB according to the first PDCP configuration;

the first BS transmitting a first plurality of PDCP Service Data Units (SDUs) to the communication device according to the first PDCP entity and a first TX_NEXT associated to the first PDCP entity;

the first BS transmitting a second RRC message on the SRB to the communication device, wherein the second RRC message configures the MCG bearer type of the DRB to a SCG bearer type or a split bearer type, and configures a second PDCP configuration for the DRB;

the first BS receiving a second RRC response message responding to the second RRC message on the SRB from the communication device;

the first BS transmitting a first COUNT value to the second BS, wherein the first COUNT value is the first TX_NEXT or a second COUNT value of a PDCP SDU of the first plurality of PDCP SDUs;

the second BS establishing a second PDCP entity according to the second PDCP configuration and deriving a second TX_NEXT from the first COUNT value; and the second BS transmitting a second plurality of PDCP SDUs to the communication device according to the second PDCP entity and the second TX_NEXT associated to the second PDCP entity.

8. The network of claim 7, wherein the instructions further comprise:

the first BS receiving a third plurality of PDCP SDUs from the communication device according to the first PDCP entity and a first RX_NEXT associated to the first PDCP entity;

the first BS transmitting a third COUNT value to the second BS, wherein the third COUNT value is the first RX_NEXT or a fourth COUNT value of a PDCP SDU of the first plurality of PDCP SDUs;

the second BS establishing a second PDCP entity according to the second PDCP configuration and deriving a second RX_NEXT from the third COUNT value; and the second BS receiving a fourth plurality of PDCP SDUs to the communication device according to the second PDCP entity and the second RX_NEXT associated to the second PDCP entity.

9. The network of claim 7, wherein the PDCP SDU of the first plurality of PDCP SDUs indicates that a successful transmission of a corresponding PDCP Protocol Data Unit (PDU) is not confirmed by a lower layer of a PDCP in the first BS.

10. The network of claim 7, wherein the instructions further comprise:

the first BS detecting a missing PDCP SDU from the first plurality of PDCP SDUs.

* * * * *